US009362830B2

(12) United States Patent
Li

(10) Patent No.: US 9,362,830 B2
(45) Date of Patent: Jun. 7, 2016

(54) SWITCH MODE POWER SUPPLY, CONTROL CIRCUIT AND ASSOCIATED CONTROL METHOD

(71) Applicant: Chengdu Monolithic Power Systems Co., Ltd., Chengdu (CN)

(72) Inventor: En Li, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 262 days.

(21) Appl. No.: 14/024,554

(22) Filed: Sep. 11, 2013

(65) Prior Publication Data

US 2014/0071714 A1    Mar. 13, 2014

(30) Foreign Application Priority Data

Sep. 11, 2012    (CN) .......................... 2012 1 0333329

(51) Int. Cl.
*H02H 7/122*    (2006.01)
*H02M 3/335*    (2006.01)
*H02M 1/32*    (2007.01)

(52) U.S. Cl.
CPC .... *H02M 3/33507* (2013.01); *H02M 2001/327* (2013.01)

(58) Field of Classification Search
CPC .................... H02M 3/33507; H02M 2001/327
USPC .................. 363/56.09, 56.03; 323/274, 56.09
See application file for complete search history.

(56) References Cited

U.S. PATENT DOCUMENTS

| | | | | |
|---|---|---|---|---|
| 6,185,082 | B1 * | 2/2001 | Yang ................................. | 361/90 |
| 7,333,781 | B1 * | 2/2008 | Stockstad ............. | H03F 1/0205 330/129 |
| 7,966,432 | B2 * | 6/2011 | Fulcheri .............. | G06F 13/4018 710/26 |
| 8,472,217 | B2 | 6/2013 | Li | |
| 2007/0002510 | A1 * | 1/2007 | Baurle ..................... | H02M 1/32 361/94 |
| 2007/0007938 | A1 * | 1/2007 | Djenguerian ..... | H02M 3/33507 323/284 |
| 2007/0195559 | A1 * | 8/2007 | Gong ......................... | 363/21.01 |
| 2010/0073967 | A1 * | 3/2010 | Tatsukawa ......... | H02M 3/33507 363/21.18 |
| 2010/0124084 | A1 * | 5/2010 | Chang et al. .................... | 363/95 |
| 2010/0214807 | A1 | 8/2010 | Li | |
| 2010/0302816 | A1 * | 12/2010 | Hu ..................... | H02M 3/33507 363/21.12 |
| 2011/0194311 | A1 * | 8/2011 | Gaknoki ............... | H02M 7/217 363/21.12 |
| 2011/0228570 | A1 | 9/2011 | Li | |
| 2013/0294118 | A1 * | 11/2013 | So ..................... | H02M 3/33507 363/21.16 |
| 2016/0006358 | A1 * | 1/2016 | Chen ................. | H02M 3/33507 363/21.16 |

* cited by examiner

*Primary Examiner* — Jessica Han
*Assistant Examiner* — Lorena Bruner
(74) *Attorney, Agent, or Firm* — Perkins Coie LLP

(57) ABSTRACT

A switch mode power supply having an output terminal configured to provide an output voltage, the switch mode power supply has a first switch and a control circuit, wherein the control circuit is configured to receive a current sense signal via a reuse input pin when the first switch is turned ON, and the control circuit is configured to receive a voltage sense signal via a reuse input pin when the first switch is turned OFF.

18 Claims, 7 Drawing Sheets

SWITCH MODE POWER SUPPLY, CONTROL CIRCUIT AND ASSOCIATED CONTROL METHOD

CROSS-REFERENCE TO RELATED APPLICATION(S)

This application claims the benefit of CN application No. 201210333329.0, filed on Sep. 11, 2012, and incorporated herein by reference.

TECHNICAL HELD

The present invention relates to electrical circuit, more particularly but not exclusively relates to switch mode power supply.

BACKGROUND

Recently, direct current (DC) signal, such as DC voltage or DC current is widely used as power supply for many electronic products. Switch mode power supply may be employed to provide DC voltage or DC current. Switch mode power supply may comprise energy storage element such as inductor or transformer. Taking flyback converter as one example, a switch is coupled to a primary winding of a transformer, and the switch is turned ON/OFF to regulate an output voltage or an output current via storing and transferring energy to a secondary winding of the transformer alternately.

With development of electronic technology, it is believed that the development trends of switch mode power supply would be high integration and high reliability. Generally, control circuit for controlling switch mode power supply may be integrated on an Integrated Circuit (IC), and a control IC is configured to provide general control function to turn ON and/or turn OFF a switch and is configured to provide protection such as over current protection, over voltage protection or over temperature protection.

The control IC may have a current sense pin and a voltage sense pin, the current sense pin is configured to receive a current sense signal for over current protection and the voltage sense pin is configured to receive a voltage sense signal for over voltage protection. The control IC also needs over temperature protection. Traditionally, there are two major methods providing over temperature protection. One method is to integrate temperature sense circuit and protection circuit on the control IC. But there are many disadvantages such as larger chip area, lower sensing accuracy, lower reliability and lower flexibility and having a fixed over temperature protection point which can not vary for different application. The other method is to add a temperature sense pin and detect temperature through external circuit, but the disadvantage is that larger package size is needed.

SUMMARY

It is one of the objects of the present invention to provide a switch mode power supply, control circuit and associated control method to resolve one or more problems described above.

One embodiment of the present invention discloses a control circuit for controlling a switch mode power supply. The switch mode power supply comprises a first switch, wherein the control circuit having a reuse input pin configured to receive a current sense signal and a voltage sense signal, wherein the control circuit comprises a sample selection unit, a first protection unit, a second protection unit and a driving control unit. The sample selection unit comprises an input terminal, a first output terminal, a second output terminal and a control terminal, wherein the input terminal is coupled to the reuse input pin of the control circuit, the control terminal is configured to receive a switching control signal, and wherein when the first switch is turned ON, the reuse input pin is coupled to the first output terminal of the sample selection unit, and when the first switch is turned OFF, the reuse input pin is coupled to the second output terminal of the sample selection unit. The first protection unit comprises a first input terminal, a second input terminal and an output terminal, wherein the first input terminal is coupled to the first output terminal of the sample selection unit, the second input terminal is configured to receive a first threshold signal, and the output terminal is configured to provide a first protection signal based on the current sense signal and the first threshold signal. The second protection unit comprises a first input terminal, a second input terminal and an output terminal, wherein the first input terminal is coupled to the second output terminal of the sample selection unit, the second input terminal is configured to receive a second threshold signal, the output terminal is configured to provide a second protection signal based on the voltage sense signal and the second threshold signal. The driving control unit comprises a first input terminal, a second input terminal, a third input terminal and an output terminal, wherein the first input terminal is coupled to the output terminal of the first protection unit, the second input terminal is coupled to the output terminal of the second protection unit, the third input terminal is configured to receive a driving signal, and the output terminal is coupled to the control terminal of the first switch to provide a switching control signal.

Another embodiment of the present invention discloses a switch mode power supply, wherein the switch mode power supply comprises a first switch, an energy storage element, a current sense circuit, a voltage sense circuit and a control circuit. The first switch is configured to be turned ON or OFF by a switching control signal. The energy storage element is coupled to the first switch, wherein the energy storage element is configured to store energy when the first switch is turned ON, and the energy storage element is configured to transfer energy when the first switch is turned OFF. The current sense circuit is configured to provide a current sense signal based on a current flowing through the first switch. The voltage sense circuit is configured to provide a voltage sense signal based on an output voltage of the switch mode power supply. The control circuit is configured to provide a switching control signal to a control terminal of the first switch, wherein the control circuit comprises a reuse input pin to receive the current sense signal and the voltage sense signal, wherein when the first switch is turned ON, a first protection signal is provided via comparing a voltage on the reuse input pin with a first threshold signal, and when the first switch is turned OFF, a second protection signal is provided via comparing the voltage on the reuse input pin with a second threshold signal.

Yet another embodiment of the present invention discloses a control method for a switch mode power supply. The switch mode power supply comprises a first switch and a transformer comprises a primary winding coupled to the first switch, a secondary winding and an auxiliary winding, wherein the control method comprises testing a current flowing through the first switch and providing a current sense signal, testing a voltage across the auxiliary winding and providing a voltage sense signal, receiving the current sense signal and the voltage sense signal via a reuse input pin, when a switching control signal is in a first state, turning ON the first switch and providing a first protection signal via comparing the current sense signal with a first threshold signal, when the switching control signal is in a second state, turning OFF the first switch and providing a second protection signal via comparing the voltage sense signal with a second threshold signal, and entering into protection mode when the first protection signal or the second protection signal is effective.

With embodiments of the present invention, it is flexible to achieve multi-protection with low cost and miniaturization of a control Integrated Circuit.

BRIEF DESCRIPTION OF THE DRAWINGS

Non-limiting and non-exhaustive embodiments are described with reference to the following drawings.

The use of the same reference label in different drawings indicates the same or like components.

DETAILED DESCRIPTION

In the present application, numerous specific details are provided, such as examples of circuits, components, and methods, to provide a thorough understanding of embodiments of the invention. These embodiments are exemplary, not to confine the scope of the invention. Persons of ordinary skill in the art will recognize, however, that the invention can be practiced without one or more of the specific details. In other instances, well-known details are not shown or described to avoid obscuring aspects of the invention. Some phrases are used in some exemplary embodiments. However, the usage of these phrases is not confined to these embodiments. Flyback converter is taken as one example hereinafter, but one of ordinary skill in the art should understand that any suitable topology may be adopted, such as step-down (buck) converter, step-up (boost) converter, buck-boost converter, flyback converter, forward converter and so on.

Figure 1:
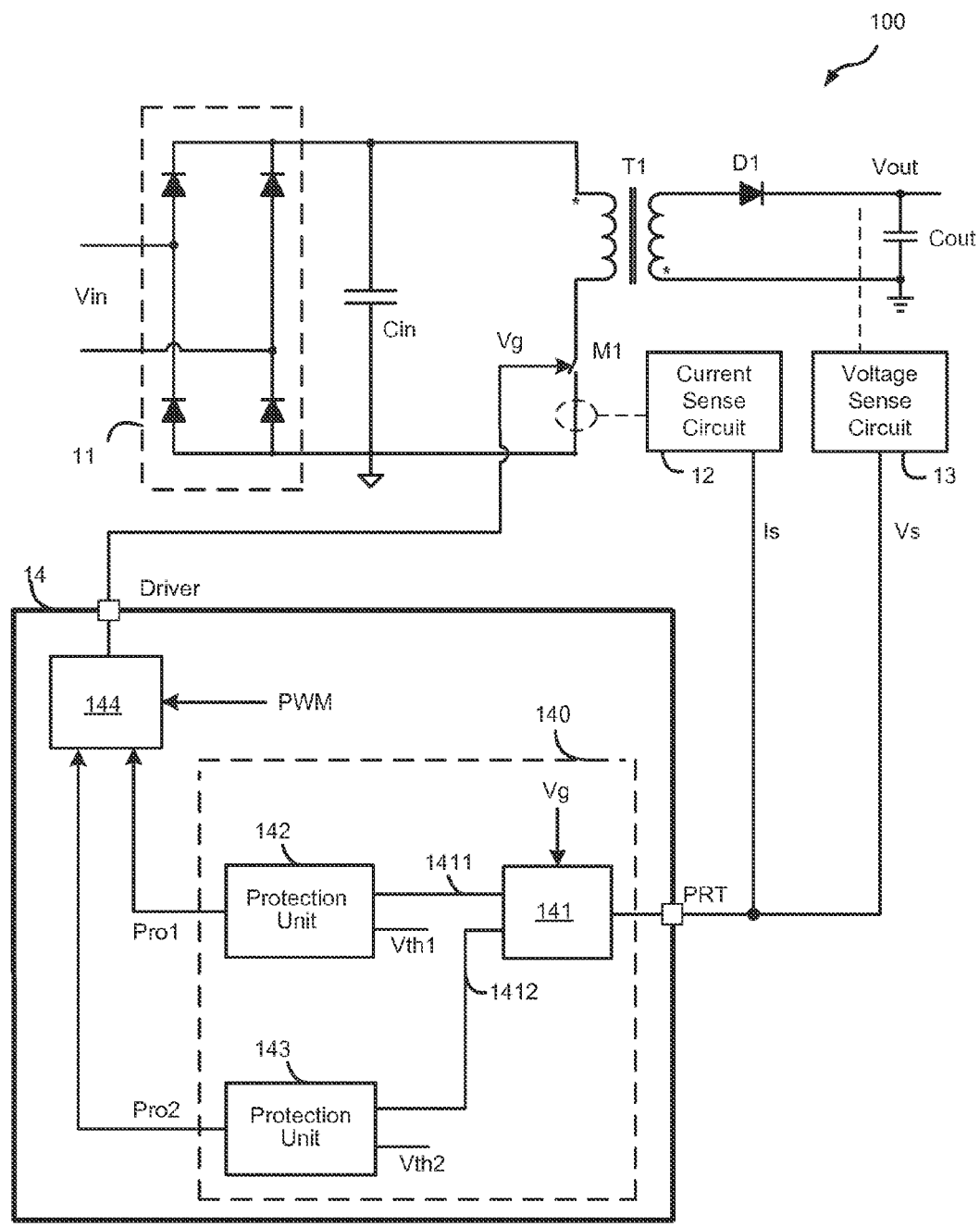
FIG. 1 illustrates a circuit block diagram of a switch mode power supply 100 according to an embodiment of the present invention.

FIG. 1 illustrates a circuit block diagram of a switch mode power supply 100 according to an embodiment of the present invention. As shown in FIG. 1, switch mode power supply 100 comprises a bridge rectifier 11, an input capacitor Cin, a transformer T1, a switch M1, a diode D1, an output capacitor Cout, a current sense circuit 12, a voltage sense circuit 13 and a control circuit 14. Bridge rectifier 11 is configured to receive an alternating input voltage Vin and is configured to provide a direct input voltage across input capacitor Cin. One terminal of input capacitor Cin is coupled to a first terminal of a primary winding of transformer T1, the other terminal of input capacitor Cin is couple to a primary ground. Switch M1 is coupled between a second terminal of the primary winding of transformer T1 and the primary ground. Diode D1 comprises an anode and a cathode, wherein the anode is coupled to a first terminal of a secondary winding of transformer T1, and the cathode is coupled to one terminal of output capacitor Cout. The other terminal of output capacitor Cout is coupled to a second terminal of the secondary winding of transformer T1. In one embodiment, the second terminal of the secondary winding of transformer T1 is coupled to a secondary ground. A voltage across output capacitor Cout is an output voltage Vout. In one embodiment, diode D1 may be replaced by a synchronous rectifier. Switch M1 may be any suitable semiconductor switching device, such as Metal Oxide Semiconductor Field Effect Transistor (MOSFET), Insulated Gate Bipolar Translator (IGBT) and so on. Switch M1 comprises a control terminal configured to receive a switching control signal Vg. Switch M1 is turned ON and/or turned OFF by switching control signal Vg to regulate output voltage Vout or an output current. In one embodiment, transformer T1 is configured to store energy when switch M1 is turned ON, and is configured to transfer energy to secondary side when switch M1 is turned OFF.

Current sense circuit 12 is configured to provide a current sense signal Is via testing a current flowing through switch M1. Current sense circuit 12 may comprise a resistor, a transformer, or a current amplifier. In one embodiment, current sense signal Is is used for over current protection. Voltage sense circuit 13 is configured to provide a voltage sense signal Vs representing output voltage Vout. Voltage sense circuit 13 may comprise an optocoupler or a transformer. In one embodiment, transformer T1 comprises an auxiliary winding, and voltage sense circuit 13 is configured to provide voltage sense signal Vs via testing a voltage across the auxiliary winding of transformer T1. In one embodiment, voltage sense circuit 13 comprises a resistor divider or a capacitor divider. In one embodiment, voltage sense signal Vs is used for over voltage protection. In another embodiment, voltage sense circuit 13 comprises a thermosensitive element, and voltage sense signal Vs would vary with temperature and may be used for over temperature protection.

In one embodiment, control circuit 14 is integrated on an Integrated Circuit (IC). Control circuit 14 comprises a reuse input pin PRT and an output pin Driver. In one embodiment, control circuit 14 is configured to provide switching control signal Vg via pin Driver. Reuse input pin PRT is coupled to current sense circuit, 12 and voltage sense circuit 13. In one embodiment, control circuit 14 is configured to receive current sense signal Is via reuse input pin PRT when switch M1 is turned ON, and control circuit 14 is configured to receive voltage sense signal Vs via reuse input pin PRT when switch M1 is turned OFF. Control circuit 14 is configured to provide a protection signal Pro1 via comparing a voltage at reuse input pin PRT with a threshold signal Vth1 when switch M1 is turned ON, and Control circuit 14 is configured to provide a protection signal Pro2 via comparing the voltage at reuse input pin PRT with a threshold signal Vth2 when switch M1 is turned OFF. Control circuit 14 is configured to provide an effective or ineffective switching control signal Vg based on protection signal Pro1 and/or protection signal Pro2. In one embodiment, when protection signal Pro1 is effective, switch mode power supply 100 transits to a protection mode, such as over current protection mode. In one embodiment, when protection signal Pro2 is effective, switch mode power supply 100 transits to the protection mode, such as over voltage protection mode or over temperature protection mode.

In one embodiment, control circuit 14 comprises a protection circuit 140 and a driving control unit 144. Protection circuit 140 comprises a sample selection unit 141, a protection unit 142 and a protection unit 143. Sample selection unit 141 comprises an input terminal, a first output terminal 1411, a second output terminal 1412 and a control terminal, wherein the input terminal is coupled to reuse input pin PRT, the control terminal is configured to receive switching control signal Vg. The first output terminal 1411 of sample selection unit 141 is coupled to reuse input pin PRT to receive current sense signal Is when switch M1 is turned ON, and the second output terminal 1412 of sample selection unit 141 is coupled to reuse input pin PRT to receive voltage sense signal Vs when switch M1 is turned OFF. Protection unit 142 is coupled to the first output terminal 1411 of sample selection unit 141 and is configured to provide protection signal Pro1 based on current sense signal Is and threshold signal Vth1. In one embodiment, protection unit 142 is configured to provide protection signal Pro1 by comparing current sense signal Is with threshold signal Vth1. When current sense signal Is is larger than threshold signal Vth1, protection signal Pro1 is effective, e.g., high voltage level. In one embodiment, protection signal Pro1 is an over current protection signal. Protection unit 143 is coupled to the second output terminal 1412 of sample selection unit 141, and is configured to provide protection signal Pro2 based on voltage sense signal Vs and threshold signal Vth2. In one embodiment, protection unit 143 is configured to provide protection signal Pro2 by comparing voltage sense signal Vs with threshold signal Vth2. When voltage sense signal Vs is larger than threshold signal Vth2, protection signal Pro2 is effective, e.g., high voltage level. In one embodiment, protection signal Pro2 is an over voltage protection signal or an over temperature protection signal. Driving control unit 144 is configured to receive protection signal Pro1, protection signal Pro2 and a driving signal PWM, and is configured to provide switching control signal Vg to a control terminal of switch M1 via pin Driver. Driving control unit 144 is configured to provide a protection based on protection signal Pro1 and protection signal Pro2, and is configured to determine whether providing switching control signal Vg based on driving signal PWM. In one embodiment, when protection signal Pro1 and protection signal Pro2 are both ineffective, e.g., Pro1=0 and Pro2=0, switching control signal Vg is provided based on driving signal PWM, i.e., Vg=PWM. In one embodiment, when protection signal Pro1 or protection signal Pro2 is effective, e.g., Pro1=1 or Pro2=1, driving control unit 144 provides the protection, such as over current protection, over voltage protection or over temperature protection, switching control signal Vg is ineffective, e.g., Vg=0, to turn OFF switch M1.

In one embodiment, a feedback control unit is employed to provide driving signal PWM based on output voltage Vout. In one embodiment, driving signal PWM may be provided via a voltage control unit, an average current control unit, a peak current control unit or any other suitable control unit.

Figure 2:
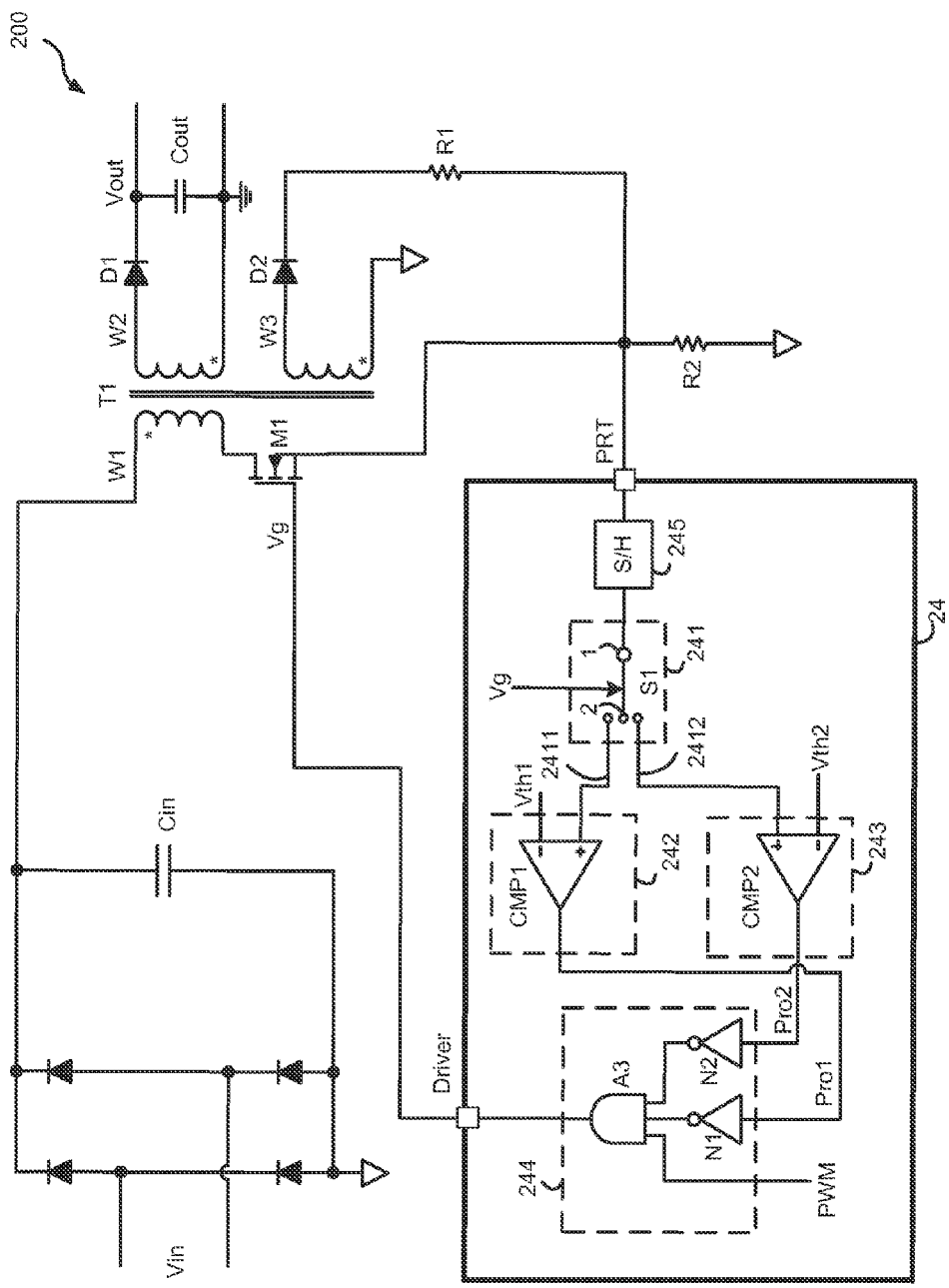
FIG. 2 schematically illustrates a switch mode power supply 200 according to an embodiment of the present invention.

FIG. 2 schematically illustrates a switch mode power supply 200 according to an embodiment of the present invention. Switch mode power supply 200 comprises a bridge rectifier, input capacitor Cin, transformer T1, switch M1, diode D1, output capacitor Cout and a control circuit 24. A resistor R2 is employed as a current sense circuit. Switch M1 is coupled to the primary ground through resistor R2. When switch M1 is turned ON, a current flows through switch M1 and resistor R2, and a voltage across resistor R2 is current sense signal Is. Switch mode power supply 200 comprises a voltage sense circuit comprising a resistor R1 and a resistor R2. Transformer T1 comprises a primary winding W1, a secondary winding W2 and an auxiliary winding W3. The voltage sense circuit is configured to test a voltage across auxiliary winding W3, a first terminal of resistor R1 is coupled to a first terminal of auxiliary winding W3, a second terminal of resistor R1 is coupled to a first terminal of resistor R2, and a second terminal of resistor R2 is coupled to the primary ground and a second terminal of auxiliary winding W3. In one embodiment, the first terminal of auxiliary winding W3 is coupled to the first terminal of resistor R1 through a diode D2. Diode D2 comprises an anode and a cathode, wherein the anode is coupled to the first terminal of auxiliary winding W3, and the cathode is coupled to the first terminal of resistor R1. When switch M1 is turned OFF, a voltage across resistor R2 is voltage sense signal Vs. In one embodiment, resistor R1 is a thermosensitive element, e.g., negative temperature coefficient (NTC) resistor or positive temperature coefficient (PTC) resistor, and voltage sense signal Vs is used for over temperature protection. One of ordinary skill in the art should understand that voltage sense signal Vs may be used for any other suitable protection, e.g., over voltage protection. In one embodiment, current sense circuit and voltage sense circuit may comprise resistor divider, capacitor divider or any other suitable circuit.

Control circuit 24 comprises a reuse input pin PRT coupled to a common node of resistor R2 and resistor R1. When switch M1 is turned ON, voltage at reuse input pin PRT represents current sense signal Is, and when switch M1 is turned OFF, voltage at reuse input pin PRT represents voltage sense signal Vs.

Control circuit 24 comprises a sample selection unit 241, a protection unit 242, a protection unit 243, a driving control unit 244 and a sample and hold circuit (S/H) 245.

Voltage at reuse input pin PRT is transferred to sample selection unit 241 through sample and hold circuit 245. Sample selection unit 241 comprises a switch S1 having a control terminal, a first terminal 1 and a second terminal 2, wherein the control terminal is configured to receive switching control signal Vg, the first terminal 1 is coupled to reuse input pin PRT through sample and hold circuit 245, and the second terminal 2 is coupled to a first output terminal 2411 or a second output terminal 2412 of sampling selection circuit 241 based on switching control signal Vg. In one embodiment, when switch M1 is turned ON, voltage at reuse input pin PRT is used for over current protection, and when switch M1 is turned OFF, voltage at reuse input pin PRT is used for over voltage protection or over temperature protection. When switching control signal Vg is effective, e.g., high voltage level, the second terminal 2 of switch S1 is coupled to the first output terminal 2411 of sample selection unit 241, and when switching control signal Vg is ineffective, e.g., low voltage level, the second terminal 2 of switch S1 is coupled to the second output terminal 2412 of sample selection unit 241. In one embodiment, switch S1 comprises a single pole double throw switch.

Protection unit 242 comprises a comparator CMP1 having a non-inverting terminal, an inverting terminal and an output terminal, wherein the non-inverting terminal is coupled to the first output terminal 2411 of sample selection unit 241, and the inverting terminal is configured to receive threshold signal Vth1. When switch M1 is turned ON, voltage at reuse input pin PRT is transferred to the non-inverting terminal of comparator CMP1. In one embodiment, when switch M1 is turned ON and current sense signal Is is larger than threshold signal Vth1, protection signal Pro1 is effective, e.g., high voltage level, indicating that switch mode power supply 200 needs over current protection. In one embodiment, when a voltage at the non-inverting terminal of comparator CMP1 is larger than threshold signal Vth1, protection signal Pro1 is effective, switch mode power supply 200 needs over current protection. In one embodiment, when the voltage at the non-inverting terminal of comparator CMP1 is larger than threshold signal Vth1 during a continuous time period, protection signal Pro1 is effective, e.g., high voltage level, indicating that switch mode power supply 200 needs over current protection. In one embodiment, protection unit 242 further comprises a logic unit coupled between the output terminal of comparator CMP1 and the output terminal of protection unit 242.

Protection unit 243 comprises a comparator CMP2 having a non-inverting terminal, an inverting terminal and an output terminal, wherein the non-inverting terminal is coupled to the second output terminal 2412 of sample selection unit 241, and the inverting terminal is configured to receive threshold signal Vth2. When switch M1 is turned OFF, voltage at reuse input pin PRT is transferred to the non-inverting terminal of comparator CMP2 through sample and hold circuit 245. In one embodiment, when switch M1 is turned OFF and voltage sense signal Vs is larger than threshold signal Vth2, protection signal Pro2 is effective, e.g., high voltage level, indicating that switch mode power supply 200 needs over voltage protection or over temperature protection. In one embodiment, when a voltage at non-inverting terminal of comparator CMP2 is larger than threshold signal Vth2, protection signal Pro2 is effective, switch mode power supply needs over voltage protection or over temperature protection. In one embodiment, when the voltage at the non-inverting terminal of comparator CMP2 is larger than threshold signal Vth2 during a continuous time period, protection signal Pro2 is effective, e.g., high voltage level, indicating that switch mode power supply 200 needs over voltage protection or over temperature protection. In one embodiment, protection unit 243 further comprises a logic unit coupled between the output terminal of comparator CMP2 and the output terminal of protection unit 243.

Driving control unit 244 is configured to provide switching control signal Vg based on driving signal PWM, protection signal Pro1 and protection signal Pro2. In one embodiment, when protection signal Pro1 is effective, driving control unit 244 is configured to provide over current protection for switch mode power supply 200, e.g., provide ineffective switching control signal Vg to turn OFF switch M1. One of ordinary skill in the art should understand that any other suitable over current protection circuit and/or method may also be used without detracting from the merits of the present invention. In one embodiment, when protection signal Pro2 is effective, driving control unit 244 is configured to provide over voltage or over temperature protection for switch mode power supply 200, e.g., provide ineffective switching control signal Vg to turn OFF switch M1. One of ordinary skill in the art should understand that any other suitable over voltage protection or over temperature protection circuit and/or method may also be used without detracting from the merits of the present invention.

In the example shown in FIG. 2, driving control unit 244 comprises a NOT gate N1, a NOT gate N2 and an AND gate A3. AND gate A3 comprises a first input terminal, a second input terminal, a third input terminal and an output terminal, wherein the first input terminal is configured to receive driving signal PWM, the second input terminal is coupled to protection signal Pro1 through NOT gate N1, the third input terminal is coupled to protection signal Pro2 through NOT gate N2, and the output terminal is configured to provide switching control signal Vg. In one embodiment, when protection signal Pro1 and protection signal Pro2 are both low voltage level, driving control unit 244 is configured to provide switching control signal Vg based on driving signal PWM, and when protection signal Pro1 or protection signal Pro2 is high voltage level, driving control unit 244 is configured to provide low voltage level switching control signal Vg to turn OFF switch M1.

Figure 3:
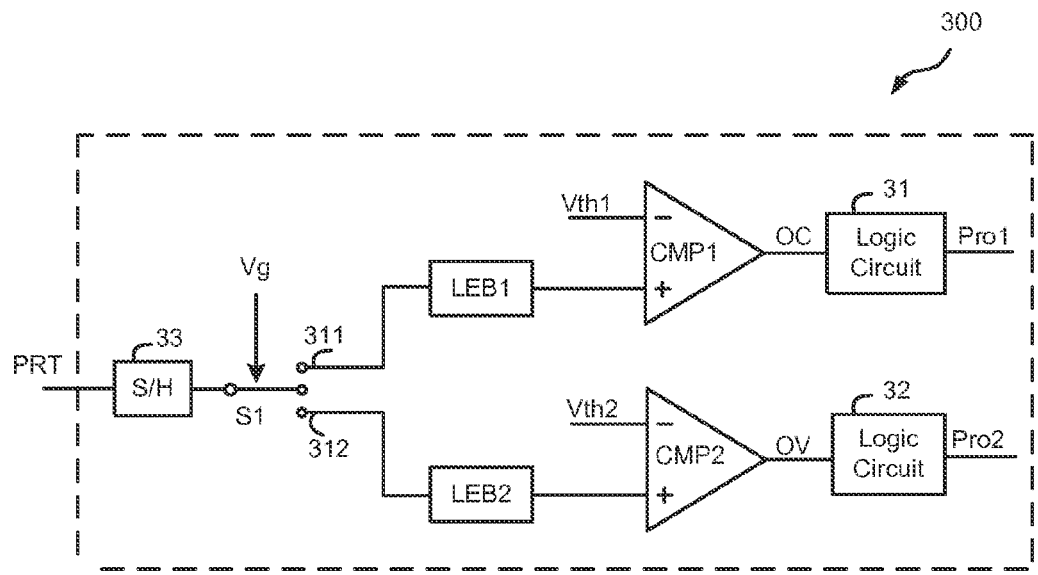
FIG. 3 schematically illustrates a protection circuit 300 according to an embodiment of the present invention.

FIG. 3 schematically illustrates a protection circuit 300 according to an embodiment of the present invention. Protection circuit 300 is configured to provide an over current indicating signal OC based on current sense signal Is and is configured to provide an over voltage indicating signal OV based on voltage sense signal Vs. Protection circuit 300 is configured to provide protection signal Pro1 based on over current indicating signal OC and is configured to provide protection signal Pro2 based on over voltage indicating signal OV. Protection circuit 300 comprises switch S1, a lead edge blanking unit LEB1, a lead edge blanking unit LEB2, comparator CMP1, comparator CMP2, logic circuit 31, logic circuit 32 and a sample and hold circuit 33.

Switch S1 comprises a control terminal, a first terminal and a second terminal, wherein the control terminal is configured to receive switching control signal Vg, the first terminal is coupled to reuse input terminal PRT through sample and hold circuit 33, and the second terminal is coupled to a node 311 or a node 312 under control of switching control signal Vg. When switching control signal Vg is effective, e.g., high voltage level, the second terminal of switch S1 is coupled to node 311, and when switching control signal Vg is ineffective, e.g., low voltage level, the second terminal of switch S1 is coupled to node 312. In one embodiment, switch S1 comprises a single pole double throw switch. In one embodiment, when switching control signal Vg is high voltage level, switch M1 is turned ON, and current sense signal Is is transferred to node 311 through sample and hold circuit 33. In one embodiment, when switching control signal Vg is low voltage level, switch M1 is turned OFF, and voltage sense signal Vs is transferred to node 312 through sample and hold circuit 33.

Lead edge blanking unit LEB1 is coupled between node 311 and the non-inverting terminal of comparator CMP1 and lead edge blanking unit LEB2 is coupled between node 312 and the non-inverting terminal of comparator CMP2. Lead edge blanking unit LEB1 and lead edge blanking unit LEB2 are employed to avoid an inaccurate signal caused by a parasitic capacitance during switching of switch M1. In one embodiment, lead edge blanking unit LEB1/LEB2 may comprise a resistor and/or a capacitor. In one embodiment, lead edge blanking unit LEB1/LEB2 may comprise a switch, and during a blanking time period, a voltage at node 311/312 is not transferred to comparator CMP1/CMP2. The non-inverting terminal of comparator CMP1 is coupled to node 311 through lead edge blanking unit LEB1, the inverting terminal of comparator CMP1 is configured to receive threshold signal Vth1, and the output terminal of comparator CMP1 is configured to provide over current indicating signal OC. In one embodiment, when voltage at the non-inverting terminal of comparator CMP1 is larger than threshold signal Vth1, over current indicating signal OC becomes high voltage level, and switch mode power supply needs over current protection. The non-inverting terminal of comparator CMP2 is coupled to node 312 through lead edge blanking unit LEB2, the inverting terminal of comparator CMP2 is configured to receive threshold signal Vth2, and the output terminal of comparator CMP2 is configured to provide over voltage indicating signal OV. In one embodiment, when voltage at the non-inverting terminal of comparator CMP2 is larger than threshold signal Vth2, over voltage indicating signal OV becomes high voltage level, and switch mode power supply needs over voltage protection.

Logic circuit 31 comprises an input terminal and an output terminal, wherein the input terminal is coupled to the output terminal of comparator CMP1 to receive over current indicating signal OC, and the output terminal is configured to provide protection signal Pro1 based on over current indicating signal OC. In one embodiment, when over current indicating signal OC keeps effective, e.g., high voltage level, during a continuous time period, e.g., 1 us, protection signal Pro1 becomes effective, e.g., high voltage level. In another embodiment, protection signal Pro1 is low voltage level when effective.

Logic circuit 32 comprises an input terminal and an output terminal, wherein the input terminal is coupled to the output terminal of comparator CMP2 to receive over voltage indicating signal OV, and the output terminal is configured to provide protection signal Pro2 based on over voltage indicating signal OV. In one embodiment, when over voltage indicating signal OV keeps effective, e.g., high voltage level, during a continuous time period, e.g., 10 us, protection signal Pro2 becomes effective, e.g., high voltage level. In another embodiment, protection signal Pro2 is low voltage level when effective.

Figure 4:
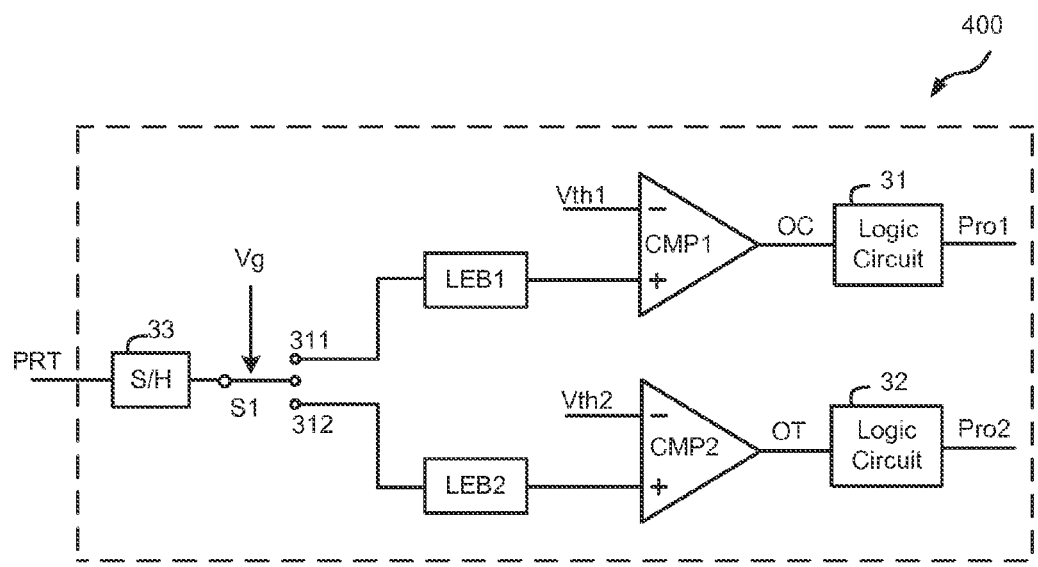
FIG. 4 schematically illustrates a protection circuit 400 according to another embodiment of the present invention.

FIG. 4 schematically illustrates a protection circuit 400 according to another embodiment of the present invention. Protection circuit 400 is configured to provide over current indicating signal OC based on current sense signal Is and is configured to provide an over temperature indicating signal OT based on voltage sense signal Vs. Protection circuit 400 is configured to provide protection signal Pro1 based on over current indicating signal OC and is configured to provide protection signal Pro2 based on over temperature indicating signal OT. Similarly to protection circuit 300 shown in FIG. 3, protection circuit 400 comprises switch S1, leading edge blanking unit LEB1, leading edge blanking unit LEB2, comparator CMP1, comparator CMP2, logic circuit 31, logic circuit 32 and sample and hold circuit 33. For simplicity, detailed descriptions for circuits same as protection circuit 300 are omitted hereinafter.

The non-inverting terminal of comparator CMP2 is coupled to the output terminal of leading edge blanking unit LEB2, the inverting terminal of comparator CMP2 is configured to receive threshold signal Vth2, and the output terminal of comparator CMP2 is configured to provide over temperature indicating signal OT. In one embodiment, when over temperature indicating signal OT is effective, e.g., high voltage level, switch mode power supply needs over temperature protection.

The input terminal of logic circuit 32 is coupled to the output terminal of comparator CMP2 to receive over temperature indicating signal OT, and the output terminal of comparator CMP2 is configured to provide protection signal Pro2 based on over temperature indicating signal OT. In one embodiment, when over temperature indicating signal OT keeps effective, e.g., high voltage level, during a continuous time period, such as 100 us, protection signal Pro2 becomes effective, e.g., high voltage level. In another embodiment, protection signal Pro2 is low voltage level when effective.

Figure 5:
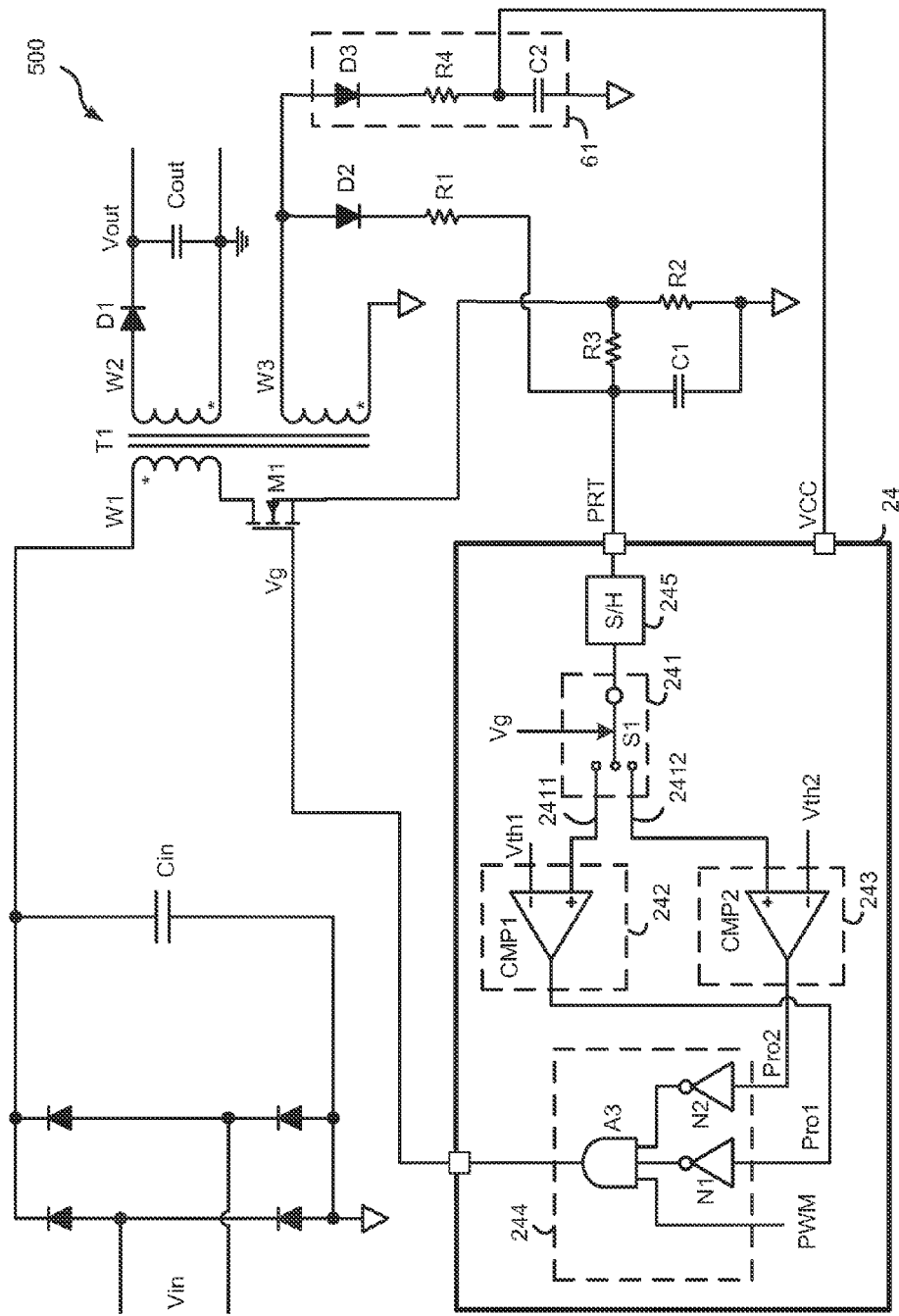
FIG. 5 schematically illustrates a switch mode power supply 500 according to another embodiment of the present invention.

FIG. 5 schematically illustrates a switch mode power supply 500 according to another embodiment of the present invention. Similarly to switch mode power supply 200, switch mode power supply 500 comprises a bridge rectifier, input capacitor Cin, transformer T1, switch M1, diode D1, output capacitor Cout and control circuit 24. The differences between switch mode power supply 200 and switch mode power supply 500 are that switch mode power supply 500 further comprises an auxiliary power supply circuit 61 and a filter coupled between current/voltage sense circuits and reuse input pin PRT. The filter comprises a resistor R3 and a capacitor C1. A first terminal of resistor R3 is coupled to the common node of resistor R2 and switch M1, a second terminal of resistor R3 is coupled to reuse input pin PRT. A first terminal of capacitor C1 is coupled to the second terminal of resistor R3, a second terminal of capacitor C1 is coupled to the other terminal of resistor R2. In one embodiment, when switch M1 is turned ON, voltage at reuse input pin PRT is current sense signal Is, and when switch M1 is turned OFF, voltage at reuse input pin PRT is voltage sense signal Vs. In one embodiment, resistor R1 is a thermosensitive element, such as a NTC (negative temperature coefficient) resistor or a PTC (positive temperature coefficient) resistor. In one embodiment, voltage sense signal Vs is used for over temperature protection. In another embodiment, voltage sense signal Vs may be used for other suitable protection, such as over voltage protection.

When switch M1 is turned ON, reuse input pin PRT is configured to receive current sense signal Is, and protection circuit 242 is configured to provide protection signal Pro1 for over current protection based on current sense signal Is and threshold signal Vth1. When switch M1 is turned OFF, reuse input pin PRT is configured to receive voltage sense signal Vs, and protection circuit 243 is configured to provide protection signal Pro2 for over temperature protection or over voltage protection based on voltage sense signal Vs and threshold signal Vth2.

In one embodiment, auxiliary voltage supply circuit 61 comprises a diode D3, a resistor R4 and a capacitor C2. An anode of diode D3 is coupled to one terminal of auxiliary winding W3, and a cathode of diode D3 is coupled to a first terminal of resistor R4. A second terminal of resistor R4 is coupled to a first terminal of capacitor C2, and a second terminal of capacitor C2 is couple to the primary ground, a voltage across capacitor C2 is an auxiliary power supply. Control circuit 24 is configured to receive the auxiliary power supply at pin VCC. In one embodiment, the auxiliary power supply is employed to power control circuit 24. In one embodiment, when switch M1 is turned OFF, auxiliary winding W3 is configured to provide the auxiliary power supply through diode D3, resistor R4 and capacitor C2.

Figure 6:
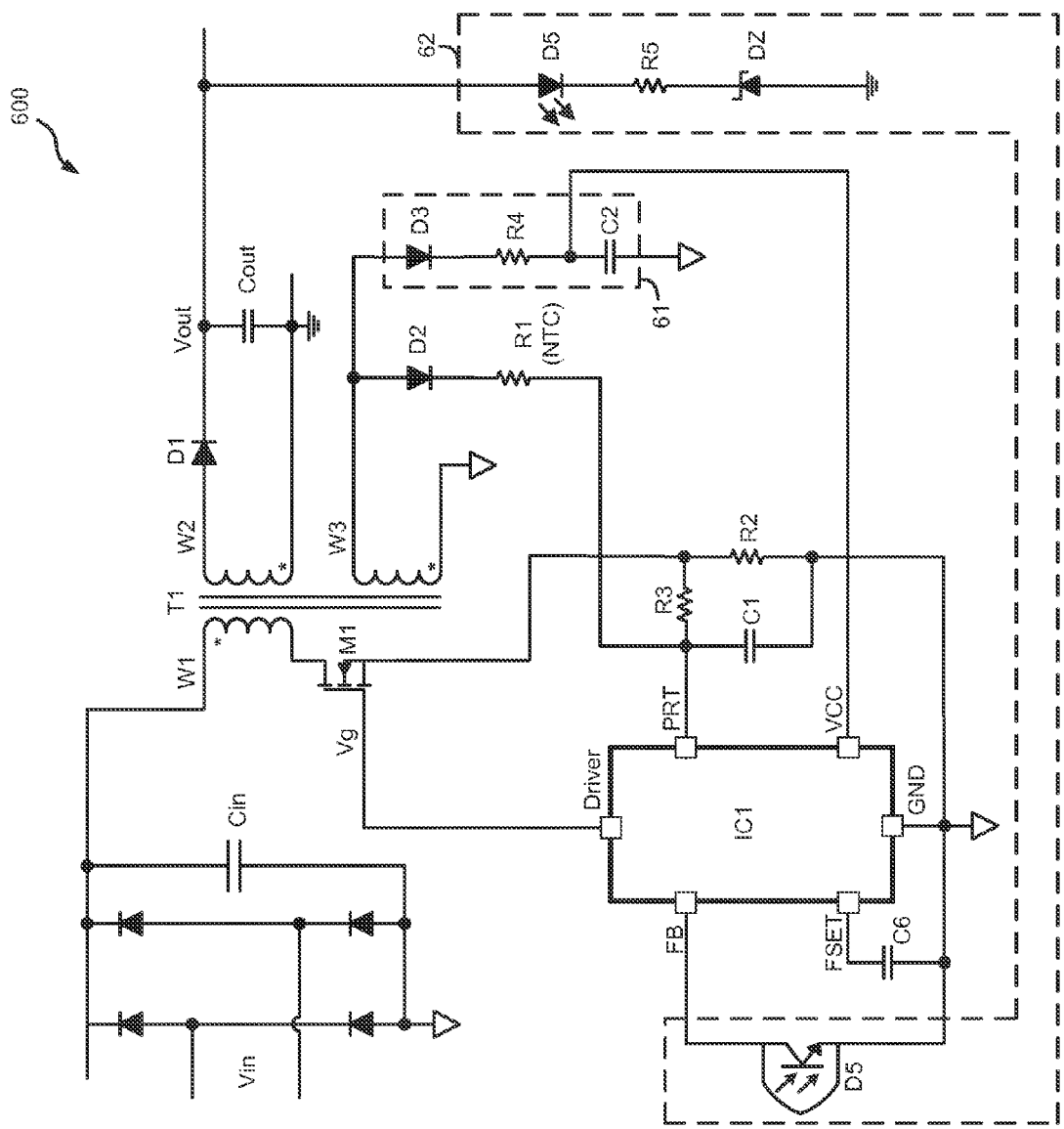
FIG. 6 schematically illustrates a switch mode power supply 600 with secondary side control according to an embodiment of the present invention.

FIG. 6 schematically illustrates a switch mode power supply 600 with secondary side control according to an embodiment of the present invention. In another embodiment, a primary side control may be employed. For simplicity, circuits similar to switch mode power supply 500 are not detailed described hereinafter.

In the embodiment shown in FIG. 6, resistor R1 is a temperature sensitive element, i.e., resistance of resistor R1 varies with temperature. In one embodiment, resistor R1 is a negative temperature coefficient resistor. In one embodiment, when switch M1 is turned ON, the voltage at reuse input pin PRT is used for over current protection, and when switch M1 is turned OFF, the voltage at reuse input pin PRT is used for over temperature protection.

Switch mode power supply 600 further comprises a feedback circuit 62. Feedback circuit 62 comprises an optocoupler D5, a resistor R5 and a Zener diode DZ, wherein a light-emitting diode of optocoupler D5, resistor R5 and Zener diode DZ are serially coupled between an output terminal of switch mode power supply 600 and the secondary ground, a phototransistor of optocoupler D5 is coupled between feedback pin FB and the primary ground to provide a feedback signal. In one embodiment, a feedback circuit may be configured to provide the feedback signal indicating output voltage Vout of switch mode power supply 600 via testing the voltage across auxiliary winding W3.

In one embodiment shown in FIG. 6, switch mode power supply 600 comprises a control Integrated Circuit IC1 as a control circuit. In one embodiment, control Integrated Circuit IC1 comprises a reuse input pin PRT, an auxiliary power supply pin VCC, a driving pin Driver, a feedback pin FB, a frequency setting pin FSET and a ground pin GND. In one embodiment, a capacitor C6 is coupled between frequency setting pin FSET and ground pin GND. In another embodiment, capacitor C6 is integrated in control Integrated Circuit IC1.

Figure 7:
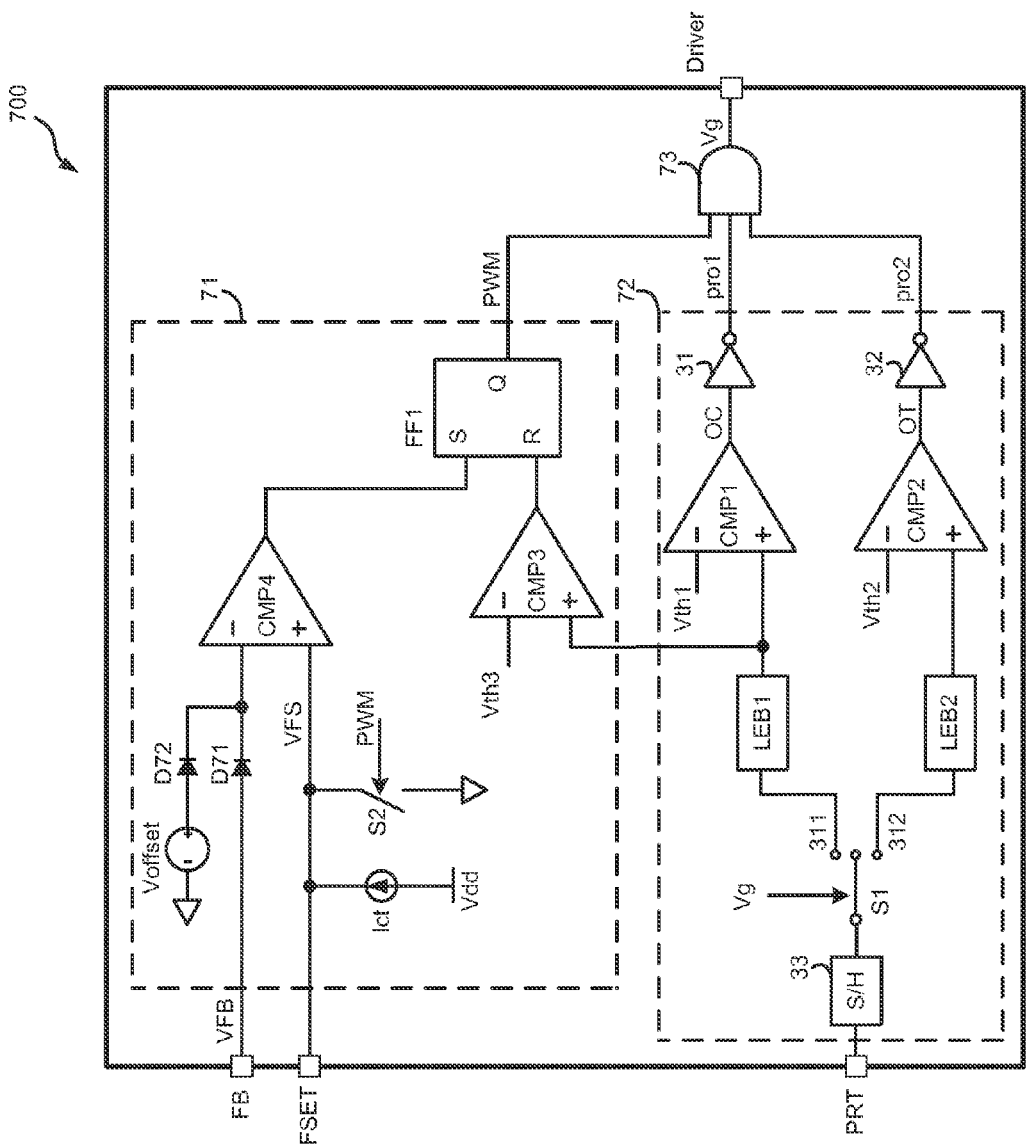
FIG. 7 schematically illustrates an internal circuit 700 of a control Integrated Circuit IC1 shown in FIG. 6 according to an embodiment of the present invention.

FIG. 7 schematically illustrates an internal circuit 700 of control Integrated Circuit IC1 shown in FIG. 6 according to an embodiment of the present invention. Circuit 700 comprises a feedback control circuit 71, a protection circuit 72 and a logic circuit 73.

Feedback control circuit 71 is coupled to feedback pin FB and frequency setting pin FSET, and is configured to provide driving signal PWM. Feedback control circuit 71 comprises a comparator CMP3, a comparator CMP4 and a flip-flop FF1. Comparator CMP3 comprises a non-inverting terminal, an inverting terminal and an output terminal, wherein the non-inverting terminal is coupled to node 311 to receive current sense signal Is, the inverting terminal is configured to receive a threshold signal Vth3, and the output terminal is coupled to a reset terminal of flip-flop FF1. In one embodiment, when current sense signal Is is larger than threshold signal Vth3, flip-flop FF1 is configured to provide ineffective driving signal PWM to turn OFF switch M1. Comparator CMP4 comprises a non-inverting terminal, an inverting terminal and an output terminal, wherein the non-inverting terminal is coupled to frequency setting pin FSET, and the inverting terminal is coupled to feedback pin FB to receive a feedback signal VFB through a diode D71 and is coupled to a voltage source to receive a bias voltage Voffset through a diode D72. Voltage at the inverting terminal of comparator CMP4 is a larger one of feedback signal VFB and bias voltage Voffset. A current source Iset comprises a first terminal configure to receive a reference voltage Vdd and a second terminal coupled to frequency setting pin FSET. A switch S2 comprises a first terminal, a second terminal and a control terminal, wherein the first terminal is coupled to frequency setting pin FSET and the second terminal of current source Iset, the second terminal is coupled to the primary ground, and the control terminal is configured to receive driving signal PWM. A capacitor C6 is coupled between frequency setting pin FSET and ground pin GND as shown in FIG. 6. When switch S2 is turned OFF, capacitor C6 is charged via current source Iset, and when switch 52 is turned ON, capacitor C6 is discharged quickly. The output terminal of comparator CMP4 is coupled to a set terminal of flip-flop FF1.

Protection circuit 72 is coupled to reuse input pin PRT and is configured to provide protection signal Pro1 and protection signal Pro2. Similar to protection circuit 400 shown in FIG. 4, protection circuit 72 comprises switch S1, lead edge blanking circuit LEB1, lead edge blanking circuit LEB2, comparator CMP1, comparator CMP2, logic circuit 31, logic circuit 32 and sample and hold circuit 33.

Logic circuit 73 is configured to receive driving signal PWM, protection signal Pro1 and protection signal Pro2, and is configured to provide switching control signal Vg. In one embodiment, logic circuit 73 comprises an AND gate.

One of ordinary skill in the art should appreciate that detailed circuits in FIG. 6 and FIG. 7 are shown as examples and any other suitable circuits may be employed without detracting spirits of this invention. In one embodiment, multiple protection circuits may be employed.

Figure 8:
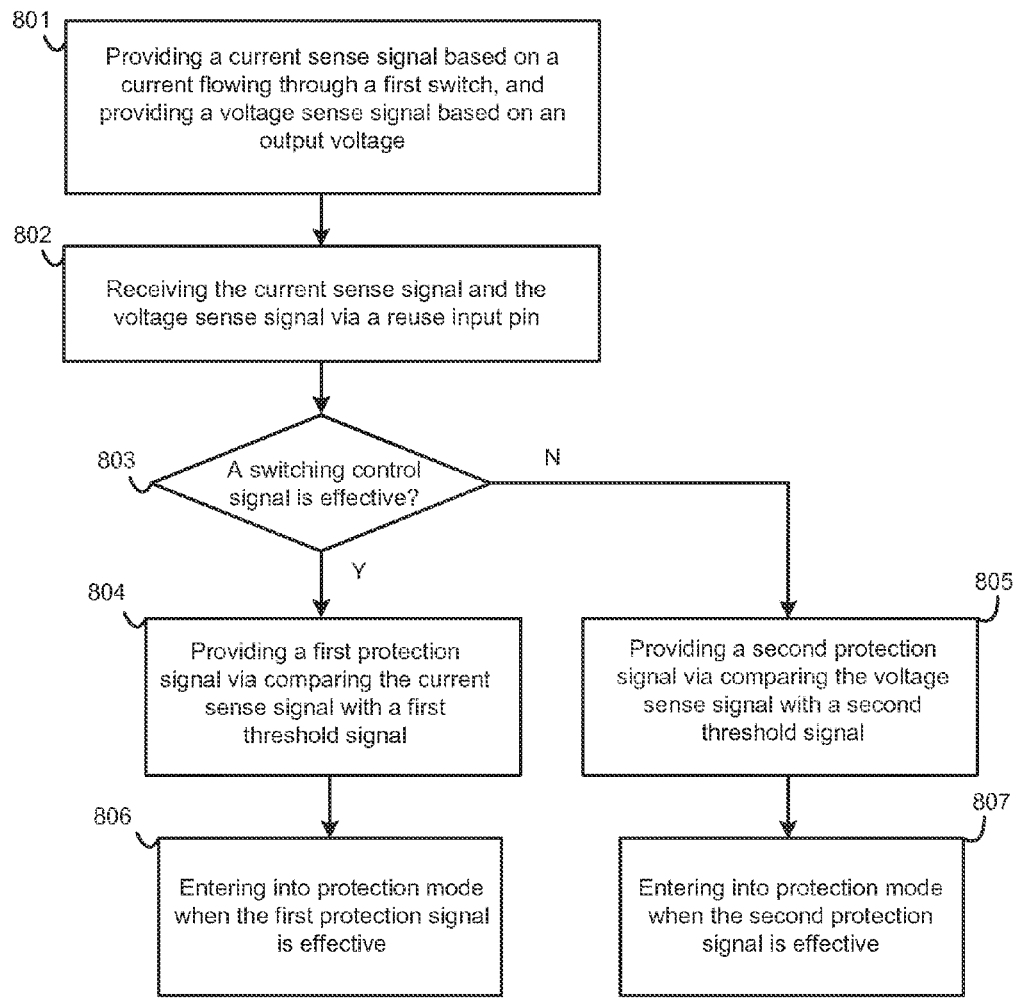
FIG. 8 shows a flow chart illustrating a control method for a switch mode power supply according to with an embodiment of the present invention.

FIG. 8 shows a flow chart illustrating a control method for a switch mode power supply according to an embodiment of the present invention. Taking switch mode power supply 500 shown in FIG. 5 as one example, the control method comprises steps 801-807. In step 801, providing a current sense signal based on a current flowing through switch M1, and providing a voltage sense signal based on output voltage Vout. In one embodiment, the voltage sense signal may be provided via testing a voltage across auxiliary winding W3. In step 802, receiving the current sense signal and voltage sense signal via reuse input pin PRT. In one embodiment, when switch M1 is turned ON, reuse input pin PRT is configured to receive the current sense signal, and when switch M1 is turned OFF, reuse input pin PRT is configured to receive the voltage sense signal. In step 803, judging that if switching control signal Vg is effective. When switching control signal Vg is effective, switch M1 is turned ON and then go into step 804, providing protection signal Pro1 via comparing the current sense signal with threshold signal Vth1. Otherwise, when switching control signal Vg is ineffective, switch M1 is turned OFF and then go into step 805, providing protection signal Pro2 via comparing the voltage sense signal with threshold signal Vth2. In one embodiment, protection signal Pro1 is used for over current protection and protection signal Pro2 is used for over voltage protection or over temperature protection.

In one embodiment, when the current sense signal is larger than threshold signal Vth1, protection signal Pro1 is effective, e.g., low voltage level. In another embodiment, when the current sense signal keeps larger than threshold signal Vth1 during a continuous time period, protection signal Pro1 is effective. In one embodiment, when the voltage sense signal is larger than threshold signal Vth2, protection signal Pro2 is effective, e.g., low voltage level. In another embodiment, when the voltage sense signal keeps larger than threshold signal Vth2 during a continuous time period, protection signal Pro2 is effective. In one embodiment, when protection signal Pro1 is effective, entering into over current protection mode. In one embodiment, when protection signal Pro2 is effective, entering into over voltage protection mode or over temperature protection mode.

In one embodiment, the control method further comprises entering into a protection mode based on protection signal Pro1 and protection signal Pro2. When the current sense signal is larger than threshold signal Vth1, protection signal Pro1 is effective, entering into the protection mode, e.g., over current protection mode, and providing ineffective switching control signal Vg to turn OFF switch M1. When the voltage sense signal is larger than threshold signal Vth2, protection signal Pro2 is effective, entering into the protection mode, e.g., over voltage protection mode or over temperature protection mode, and providing ineffective switching control signal Vg to turn OFF switch M1. Otherwise when the current sense signal is less than threshold signal Vth1 and the voltage sense signal is less than threshold signal Vth2, then providing switching control signal Vg based on driving signal PWM. In step 806, entering into over current protection mode when protection signal Pro1 is effective. In step 807, entering into over voltage protection mode or over temperature protection mode when protection signal Pro2 is effective. In one embodiment, when protection signal Pro1 or protection signal Pro2 is effective, switching control signal Vg becomes ineffective. Otherwise when protection signal Pro1 and protection signal Pro2 are both ineffective, providing switching control signal Vg based on driving signal PWM, e.g., Vg=PWM.

Note that in the flow chart described above, the box functions may also be implemented with different order as shown in FIG. 8. For example, two successive box functions may be executed meanwhile, or sometimes the box functions may be executed in reverse order.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

I claim:

1. A control Integrated Circuit (IC) for controlling a switch mode power supply, the switch mode power supply comprises a first switch having a control terminal, wherein the control IC comprising a reuse input pin, and when the first switch is turned ON, the control IC is configured to receive a current sense signal via the reuse input pin, and when the first switch is turned OFF, the control IC is configured to receive a voltage sense signal via the reuse input pin; wherein the control IC further comprising:

a first protection unit, having a first input terminal, a second input terminal, and an output terminal, wherein the second input terminal is configured to receive a first threshold signal, and the output terminal is configured to provide a first protection signal based on the first threshold signal and a voltage at the first input terminal of the first protection unit;

a second protection unit, having a first input terminal, a second input terminal, and an output terminal, wherein the second input terminal is configured to receive a second threshold signal, and the output terminal is configured to provide a second protection signal based on the second threshold signal and a voltage at the first input terminal of the second protection unit;

a driving control unit, having a first input terminal, a second input terminal, a third input terminal and an output terminal, wherein the first input terminal is coupled to the output terminal of the first protection unit, the second input terminal is coupled to the output terminal of the second protection unit, the third input terminal is configured to receive a driving signal, and the output terminal is configured to provide a switching control signal to the control terminal of the first switch; and a single pole double throw switch, having a control terminal, a first terminal and a second terminal, wherein the control terminal is coupled to the output terminal of the driving control unit, the first terminal is coupled to the reuse input pin, and the second terminal is selectively coupled to the first protection unit and the second protection unit based on the switching control signal; wherein when the first switch is turned ON, the second terminal of the single pole double throw switch is coupled to the first input terminal of the first protection unit, and the first protection unit is configured to provide the first protection signal via comparing a voltage at the reuse input pin with the first threshold signal; and when the first switch is turned OFF, the second terminal of the single pole double throw switch is coupled to the first input terminal of the second protection unit, and the second protection unit is configured to provide the second protection signal via comparing the voltage at the reuse input pin with the second threshold signal.

2. The control IC of claim 1, wherein the first protection unit comprises a first comparator, the first comparator having a first input terminal, a second input terminal and an output terminal, wherein the first input terminal of the first comparator is coupled to the second terminal of the single pole double throw switch when the first switch is turned ON, the second input terminal of the first comparator is configured to receive the first threshold signal, and the output terminal of the first comparator is configured to provide the first protection signal.

3. The control IC of claim 1, wherein the second protection unit comprises a second comparator, the second comparator having a first input terminal, a second input terminal and an output terminal, wherein the first input terminal of the second comparator is coupled to the second terminal of the single pole double throw switch when the first switch is turned OFF, the second input terminal of the second comparator is configured to receive the second threshold signal, and the output terminal of the second comparator is configured to provide the second protection signal.

4. The control IC of claim 1, wherein when the first protection signal or the second protection signal is effective, the switching control signal is ineffective to turn OFF the first switch, and when the first protection signal and the second protection signal are both ineffective, the switching control signal is effective to control the first switch based on the driving signal.

5. The control IC of claim 1, further comprising a feedback control unit, configured to provide the driving signal based on the current sense signal and a third threshold signal.

6. The control IC of claim 1, wherein when the first switch is turned ON and a voltage at the reuse input pin is larger than a first threshold signal, the control IC is configured to provide an over current protection, and when the first switch is turned OFF and a voltage at the reuse input pin is larger than a second threshold signal, the control IC is configured to provide an over voltage protection or an over temperature protection.

7. The control IC of claim 1, wherein when the current sense signal keeps larger than a first threshold signal during a continuous time period, the control IC is configured to provide an over current protection.

8. The control IC of claim 1, wherein when the voltage sense signal keeps larger than a second threshold signal during a continuous time period, the control IC is configured to provide an over voltage protection or an over temperature protection.

9. A switch mode power supply, having an input terminal and an output terminal configured to provide an output voltage, wherein the switch mode power supply comprising:

an energy storage element;

a first switch having a first terminal, a second terminal and a control terminal, wherein the first terminal of the first switch is coupled to the input terminal of the switch mode power supply through the energy storage element, and the second terminal of the first switch is coupled to a ground;

a current sense circuit configured to provide a current sense signal based on a current flowing through the first switch;

a voltage sense circuit configured to provide a voltage sense signal based on the output voltage; and a control circuit having a reuse input terminal and an output terminal, wherein the reuse input terminal is coupled to the current sense circuit and the voltage sense circuit, and the output terminal is configured to provide a switching control signal to the control terminal of the first switch; and wherein when the first switch is turned ON, the control circuit is configured to provide a first protection signal via comparing a voltage at the reuse input terminal with a first threshold signal; and when the first switch is turned OFF, the control circuit is configured to provide a second protection signal via comparing the voltage at the reuse input terminal with a second threshold signal.

10. The switch mode power supply of claim 9, wherein the reuse input terminal of the control circuit is configured to receive the current sense signal when the first switch is turned ON, and the reuse input terminal of the control circuit is configured to receive the voltage sense signal when the first switch is turned OFF.

11. The switch mode power supply of claim 9, wherein the energy storage element comprises a transformer having an auxiliary winding, wherein the voltage sense circuit is configured to provide the voltage sense signal via testing a voltage across the auxiliary winding.

12. The switch mode power supply of claim 11, wherein the voltage sense circuit comprising:
 a diode having an anode and a cathode, wherein the anode is coupled to the auxiliary winding;
 a thermosensitive element having a first terminal and a second terminal, wherein the first terminal is coupled to the cathode of the diode; and
 a resistor having a first terminal and a second terminal, wherein the first terminal is coupled to the second terminal of the thermosensitive element, and the second terminal is coupled to the ground; and wherein
 the second terminal of the thermosensitive element and the first terminal of the resistor are coupled to the reuse input terminal of the control circuit.

13. The switch mode power supply of claim 9, wherein the control circuit further comprises:
 a sample selection unit having an input terminal, a control terminal, a first output terminal and a second output terminal, wherein the input terminal of the sample selection unit is coupled to the reuse input pin, the first output terminal of the sample selection unit is coupled to the input terminal of the sample selection unit when the first switch is turned ON, and the second output terminal of the sample selection unit is coupled to the input terminal of the sample selection unit when the first switch is turned OFF;
 a first protection unit having a first input terminal, a second input terminal and an output terminal, wherein the first input terminal of the first protection unit is coupled to the first output terminal of the sample selection unit, the second input terminal of the first protection unit is configured to receive the first threshold signal, and the output terminal is configured to provide the first protection signal;
 a second protection unit having a first input terminal, a second input terminal and an output terminal, wherein the first input terminal of the second protection unit is coupled to the second output terminal of the sample selection unit, the second input terminal of the second protection unit is configured to receive the second threshold signal, and the output terminal is configured to provide the second protection signal;
 a feedback control unit configured to provide a driving signal based on the output voltage; and
 a driving control unit having a first input terminal, a second input terminal, a third input terminal and an output terminal, wherein the first input terminal of the driving control unit is coupled to the output terminal of the first protection unit, the second input terminal of the driving control unit is coupled to the output terminal of the second protection unit, the third input terminal of the driving control unit is configured to receive the driving signal, and the output terminal of the driving control unit is coupled to the control terminal of the sample selection unit and the control terminal of the first switch to provide the switching control signal.

14. The switch mode power supply of claim 13, wherein when a voltage at the first output terminal of the sample selection unit is larger than the first threshold signal, the first protection signal is effective, and when a voltage at the second output terminal of the sample selection unit is larger than the second threshold signal, the second protection signal is effective.

15. A control method for a switch mode power supply, wherein the switch mode power supply is configured to provide an output voltage, the switch mode power supply comprising a transformer and a first switch, the first switch having a control terminal, the control method comprising:
 providing a current sense signal based on a current flowing through the first switch;
 providing a voltage sense signal based on a voltage across an auxiliary winding of the transformer;
 receiving the current sense signal via a reuse input pin when the first switch is turned ON and receiving the voltage sense signal via the reuse input pin when the first switch is turned OFF;
 providing a first protection signal via comparing the current sense signal with a first threshold signal;
 providing a second protection signal via comparing the voltage sense signal with a second threshold signal when the first switch is turned OFF; and
 entering into a protection mode when the first protection signal or the second protection signal is effective.

16. The control method of claim 15, further comprising:
 providing a driving signal based on the output voltage; and
 providing a switching control signal to the control terminal of the first switch based on the first protection signal, the second protection signal and a driving signal; and wherein
 when the first protection signal or the second protection signal is effective, the switching control signal is ineffective to turn OFF the first switch; and
 when the first protection signal and the second protection signal are both ineffective, the switching control signal is provided based on the driving signal.

17. The control method of claim 15, further comprising entering into a current protection mode when the first protection signal is effective and entering into a temperature protection mode when the second protection signal is effective.

18. The control method of claim 15, further comprising entering into a current protection mode when the first protection signal is effective and entering into a voltage protection mode when the second protection signal is effective.

* * * * *